United States Patent [19]
Honda

[11] Patent Number: 5,109,437
[45] Date of Patent: Apr. 28, 1992

[54] METHOD FOR COMPRESSING DIGITAL DATA

[75] Inventor: Katsumi Honda, Saitama, Japan

[73] Assignees: Yokogawa-Hewlett-Packard Ltd., Tokyo; Kobe Steel, Ltd., Hyogo, both of Japan

[21] Appl. No.: 302,847

[22] Filed: Jan. 27, 1989

[30] Foreign Application Priority Data

Jan. 29, 1988 [JP] Japan .................................. 63-20957

[51] Int. Cl.$^5$ ............................................. G06K 9/00
[52] U.S. Cl. ...................................... 382/56; 358/433
[58] Field of Search ............... 382/56; 358/261.1, 433; 341/55

[56] References Cited

U.S. PATENT DOCUMENTS

| | | | |
|---|---|---|---|
| 4,494,151 | 1/1985 | Liao | 358/261.1 |
| 4,618,846 | 10/1986 | Ross et al. | 358/261.1 |
| 4,679,094 | 7/1987 | Rutherford et al. | 358/261.1 |
| 4,783,841 | 11/1988 | Crayson | 382/53 |
| 4,796,092 | 1/1989 | Ogata | 358/261.1 |

OTHER PUBLICATIONS

Iinuma, Usubuchi, Ishiguro, "New Method of Compressing Data for Research for Transmission Methods", Japanese Transmissions Society, CS73-36, 1979-07.
Hunter, Robinson "International Digital Facsimile Code Standard", Proc. IEEE, vol. 68, No. 7, pp. 854-867, Jul. 1980.
CCITT Recommendation T.6: "Facsimile Coding Schemes and Coding Control Functions for Group 4 Facsimile Apparatus", Malaga—Torremolinos 1984.
CSW: "Compression of File Data", I/O Dec. 1987, pp. 213-216.

*Primary Examiner*—Leo H. Boudreau
*Attorney, Agent, or Firm*—Woodcock Washburn Kurtz Mackiewicz & Norris

[57] ABSTRACT

A method for compressing digital data from an original bit stream into a coded bit stream useful for facsimile data transmission and digitized document image storage. The method comprises the steps of dividing the original bit stream into a plurality of data blocks and then comparing each of the data blocks with a reference block having a predetermined bit pattern. A coded bit stream is formed that comprises data blocks, compressed blocks and index blocks according to the following procedure. When a data block in the original bit stream is a mismatch with the reference block, the data block is included as is, without modification, in the coded bit stream along with an index bit indicating a mismatch in the index block. When a data block in the original bit stream is matched to the reference block, then compressed block is included in the coded bit stream along with an index bit in the index block indicating that the data block is matched. The compressed block indicates the number plus one of matching data blocks that are adjacent to the compared data blocks.

In the preferred embodiment two reference blocks are described and the comparison step is performed with each one. Additional reference blocks can also be used.

15 Claims, 2 Drawing Sheets

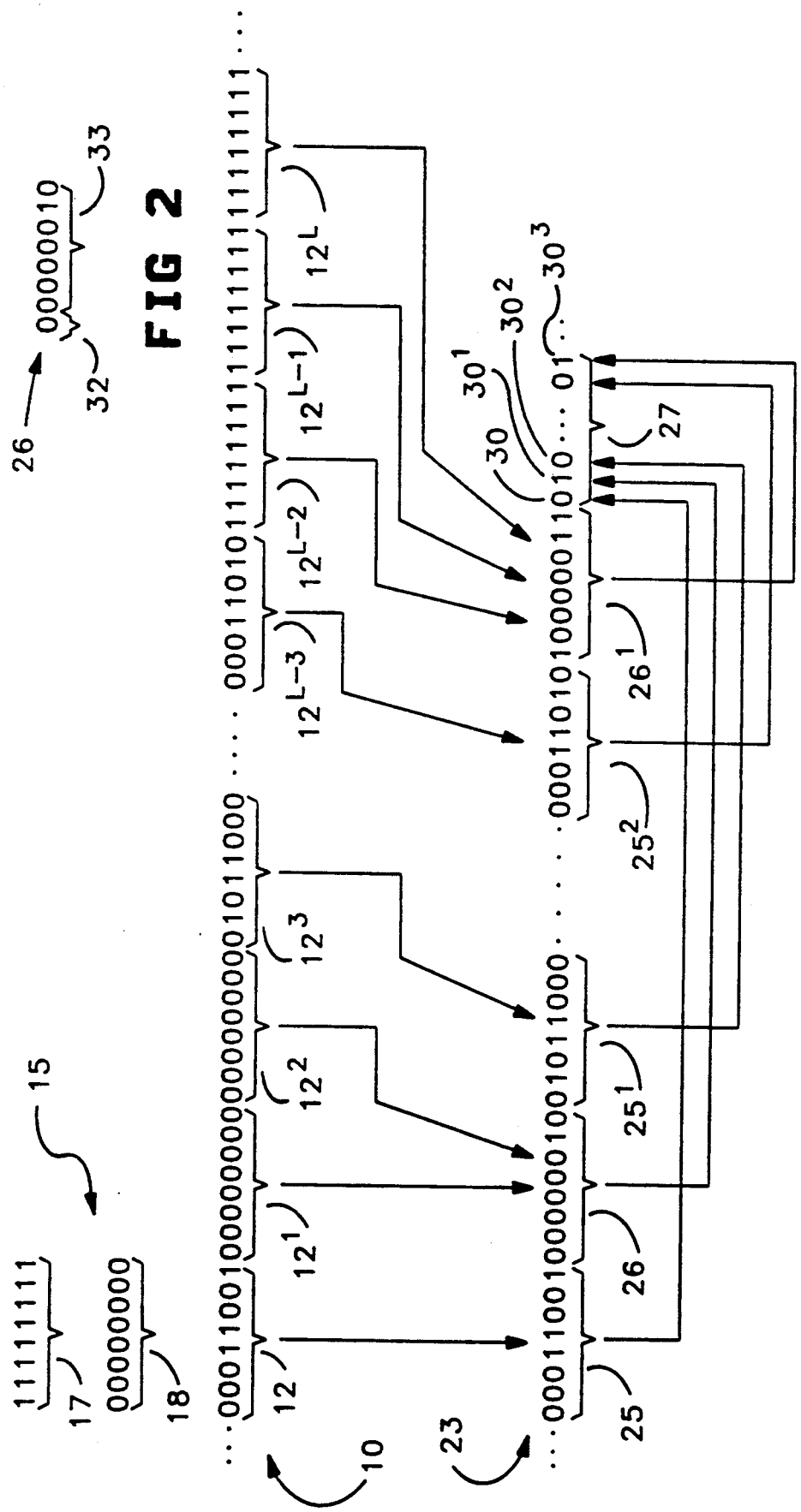

METHOD FOR COMPRESSING DIGITAL DATA

BACKGROUND OF THE INVENTION

1. Field of the Invention

The present invention relates generally to methods for compressing digital data and, more particularly, to methods for compressing digital data representing a document image into a code bit stream.

2. Background Information

Data compression techniques are widely used in facsimile data transmission systems and optical disc storage systems. In general, data compression techniques are used when documents have been converted into images and the images have been digitized for either storage or transmission. The document image is then represented by a bit stream.

The techniques of data compression have been extensively studied and are widely used today because the image data obtained from both documents and illustrations have great redundancy.

One well known method of compressing image data is run length encoding. This process involves optically scanning an image, digitizing the resulting analog output waveform, and expressing the digitized image data in terms of the lengths of each sequence of like bits. In other words, each bit represents a pixel of the image and its logic level represents either black or white. The length of each sequence of all white or all black pixels is the run length.

Of the various run length encoding methods, the modified Huffman's encoding method is the most well known. In this method, the output data having the shortest bit length is given to the statistically most frequent length. Further, there are more sophisticated run length forecasting methods which are also available. In these systems, the run length is obtained and then converted by using a table of codes so that the statically most frequent run length uses the smallest identifier.

The above-named systems do not easily lend themselves to computer processing because of the inherent slowness of serially processing the resulting bit streams.

Multi stage block encoding is a method suitable for computer processing. This technique is described in an article entitled "New Method for Compressing Data for Facsimile Signals," by Iinuma, Usubuchi, and Ishiguro, Data for Research for Transmissions Methods, the Japanese Transmissions Society, CS73-36, 1973-07. In this method, data are divided into a series of data blocks of the same length. A block representing all white is encoded as a logic "0." Other blocks are encoded as a logic "1." The bits inside of each block given a logic "1" are divided in the same manner. The division process is continued until a unit block made up of a given number of bits occurs. Thereafter, codes are assigned to the blocks and the unit blocks are transmitted.

SUMMARY OF THE INVENTION

One advantage of the present invention is to enable digital computer processing methods to be used to compress digital data representing document images.

A further advantage of the present invention is to reduce the overall cost of transmitting documents and to enable higher image transmission speeds.

The present invention contemplates a method for compressing digital data from an original bit stream. The method comprises the steps of dividing the original bit stream into a plurality of data blocks and then comparing each of the data blocks with a reference block having a predetermined bit pattern. A coded bit stream is formed that comprises data blocks, compressed blocks and index blocks according to the following procedure. When a data block in the original bit stream is a mismatch with the reference block, the data block is included as is, without modification, in the coded bit stream along with an index bit indicating a mismatch in the index block. When a data block in the original bit stream is matched to the reference block, then compressed block is included in the coded bit stream along with an index bit in the index block indicating that the data block is matched. The compressed block indicates the number plus one of matching data blocks that are adjacent to the compared data blocks.

In the preferred embodiment two reference blocks are described and the comparison step is performed with each one. Additional reference blocks can be used.

Other objects, features and advantages of the present invention will become apparent upon consideration of the following detailed description and the accompanying drawings, in which like referenced designations represent like features throughout the figures.

BRIEF DESCRIPTION OF THE DRAWINGS

FIG. 1 is a schematic representation of various sequences of bits according to the present invention.

FIG. 2 is a schematic representation of a compressed block of FIG. 1.

DESCRIPTION OF THE PREFERRED EMBODIMENTS

Figure 3:
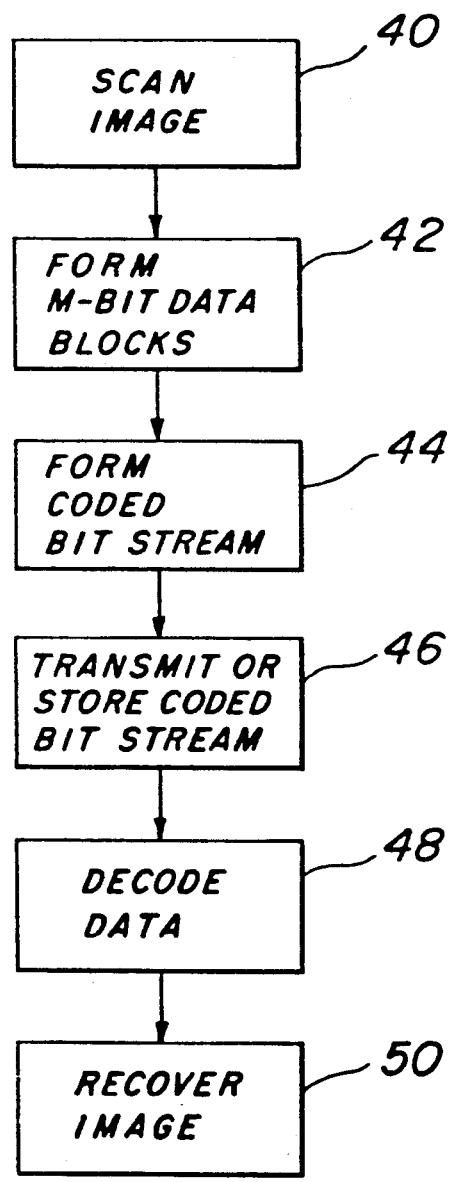
FIG. 3 is a flow diagram of a method for transmitting and/or storing image data in accordance with the present invention.

Reference is now made in detail to a specific embodiment of the present invention, which illustrates the best mode presently contemplated by the inventor for practicing the invention. Alternative embodiments are also briefly described as applicable.

Referring to FIG. 1, reference numeral 10 generally indicates an original bit stream of digital data obtained from the image of a document (not shown). This bit stream is to be encoded, compressed and subsequently transmitted according to the present invention.

The original bit stream 10 is divided into a plurality of data blocks 12. Each data block consists of a predetermined number of bits M, where M is positive integer. In the preferred embodiment each data block consists of eight bits.

Referring to FIG. 1, reference numeral 15 generally indicates two reference blocks. Each reference block is a standard to which the data blocks 12 in the original bit stream 10 are compared as described below. Each reference block contains M bits. Further, reference block 17 contains bits that are all logic "1's," and reference block 18 consists of bits that are all logic "0's."

Referring to FIG. 1, reference numeral 23 generally indicates a coded bit stream which is a result of the method of the present invention. The coded bit stream 23 contains data blocks 25, compressed blocks 26 and index blocks 27. In particular, a data block 25 is a block containing M bits and is the same as the corresponding data block 12 in the original bit stream 10. A compressed block 26 is a block containing M bits of data and contains data indicating the number plus one (N+1) of matching data blocks 12 in the original bit stream 10 that are adjacent to a data block being compared, as described further below. An index block 27 likewise contains M bits and contains a plurality of index bits 30 as described herein below.

It should be appreciated that the original bit stream 10, FIG. 1, can be travelling from left to right or right to left in time as illustrated in FIG. 1. Further, the coded bit stream 23 can likewise be travelling in either direction. Also, the index block 27 may be placed in front, medially or at the rear of any grouping of reference blocks.

The method for carrying out the present invention is performed according to the process steps set forth herein below.

The original bit stream 10 is first divided into a plurality of data blocks 12 each having 8 bits. Thereafter, each data block 12 is compared with the reference blocks 17, 18 to determine if the data block either matches or mismatches either of the reference blocks.

For example, it can be seen in FIG. 1 that data block $12^1$ matches reference block 18 as does data block $12^2$. Further, data block $12^{L-2}$ matches reference block 17. As another example, data block $12^3$ does not correspond to either of the reference blocks 17 or 18. Likewise, the data block 12 does not coincide with either reference blocks 17 or 18.

When the comparison step has been completed on a data block 12 in FIG. 1, a coded bit stream 23 is formed according to whether a match (coincidence) or mismatch (no coincidence) has been found.

If, during the comparison process, the data block in the original bit stream did not match or there was no coincidence found with either of the reference blocks 17, 18, then the data block is included "as is" in the coded bit stream 23 and an index bit 30 is included in the index block 27 indicating "difference" or no coincidence. In other words, when there is a mismatch, the sequence and logic levels are the same in blocks of the original bit stream and the coded bit stream.

For example, referring to FIG. 1, data block 12 in the original bit stream 10 becomes data block 25 in the coded bit stream 23 and data block $12^3$ is incorporated into the coded bit stream 23 as data block $25^1$. In each of these cases a logic "0" is also added to the index blocks 27. For data block 25, the index bit 30 is included, and for data block $25^1$, index bit $30^2$. The correspondence between the data blocks and the index bits is indicated by the respective pointed lines in FIG. 1.

On the other hand, if, during the comparison process, coincidence or a match is found between a data block and one of the reference blocks 17, 18, then a compressed block 26 is formed and included in the coded bit stream 23, and an index bit is included in the index block 27 indicating "coincidence" or a match. Each compressed block contains a bit indicating which reference block had the match and other bits indicating in binary the total number of similarly matching data blocks that are grouped with the data block being compared. In other words, when coincidence is found, it is determined with which reference block 17, 18 the coincidence occurred and the total number of adjacent, matching data blocks likewise having coincidence. This total number is N+1 where N is the number of adjacent data blocks. N can be 0, 1, 2, 3, ... and is 0 if there are no matching adjacent data blocks.

In particular, when coincidence is found for data blocks $12^1$ and $12^2$ with reference block 18, compressed block 26 is formed. Referring to FIG. 2, compressed block 26 consists of a match bit 32 and a plurality of number bits 33. The match bit 32 can be either a logic "0" if coincidence is found with reference block 18 or a logic "1" if coincidence is found with reference block 17. The number bits 33 indicate the binary number of adjacent, matching data blocks 12 that have also been found in coincidence with the same reference block. For example, data blocks $12^1$ and $12^2$ coincide with reference block 18, and so the number bits 33, FIG. 2 form the digital number "0000010" indicating a group of two adjacent matching data blocks $12^1$ and $12^2$. N is 1 and N+1 is 2. Likewise, the three data blocks $12^{L-2}$, $12^{L-1}$ and $12^L$ coincide with reference block 17 so that compressed block $26^1$ contains the bits "10000011." The first bit "1" is the match bit indicating coincidence with the reference block 17 and the digital number "0000011" indicates a group of three adjacent, matching data blocks. N here is 2 and N+1 is 3.

Whenever a compressed block 26 is formed and included in a coded bit stream, a corresponding index bit 30 having logic level "1" is included in the index block 27. In particular, index bit $30^1$ is added to correspond to compressed block 26; and index bit $30^3$, for compressed block $26^1$.

The coded bit stream 23 is formed on a block by block basis. After each block 25, 26 is included and the corresponding index bit 30 is added to the index block 27, the block is transmitted. After a given number of blocks are transmitted in the coded bit stream 23, then the index block 27 is transmitted. The index data blocks can either proceed or follow every given number of blocks.

When the coded bit stream 23 is received, the reception circuits first detect the index data blocks 27 to determine which of the blocks in the coded bit stream 23 are data blocks and which are compressed blocks. If a block is determined to be a data block 25, then the block is decoded as is because it was encoded without modification. If a block is determined to be a compressed block 26, that is having coincidence, then the matching reference block is first determined and then the number of matching data blocks is found. Next, the selected reference block 17, or 18 is reproduced in the bit stream in numbers equal to the number indicated in binary by the number bits 33 in the compressed block. Thus, the compressed encoded bit stream 23 is decoded and the original bit stream 10 is reconstructed.

If the number of bits representing the number of blocks being compressed, when that number is expressed in binary, is larger than the allowed number of spaces in the compressed block 26, there is the possibility of an overflow condition. In other words, an overflow situation could be possible if the number of blocks to be compressed (N+1) is greater than $2^{M-1}$ where M equals the number of bits in each compressed block. To meet this situation, when the number (N+1) can grow beyond the number $2^{M-1}$, then the first $2^{M-1}$ blocks are compressed into a first compressed block. This first block is then either transmitted or stored as described above. The process is then repeated for a second compressed block and repeated again as necessary to complete the sequence.

In the preferred embodiment the compressed block 26 indicates the number N+1. It should be appreciated, however, that the number N+b could also be used where b is any integer that is greater than or equal to 1.

The foregoing method is summarized by the flow diagram of FIG. 3. According to the flow diagram, an image to be stored and/or transmitted is scanned at step 40; M-bit data blocks are formed at step 42; a coded bit stream is formed in accordance with the above-described procedure at step 44; the coded bit stream is transmitted and/or stored at step 46; the transmitted and/or stored data is recovered and decoded at step 48; and the image data is displayed at step 50.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

I claim:

1. Method for efficiently transmitting and/or storing data representing an image, comprising the steps of:
   a) scanning an image to obtain an original bit stream representative of the image;
   b) dividing the original bit stream into a plurality of data blocks;
   c) comparing each data block for one of either a match or a mismatch with a reference block having a predetermined bit pattern;
   d) forming a coded bit stream comprising an ordered sequence of a plurality of data blocks and compressed blocks and an index block, as follows:
      when a data block in the original stream is a mismatch with the reference block, including the data block as is and including an index bit indicating a mismatch in the index block; and
      when a data block in the original bit stream is a match with the reference block, including a compressed block indicating the number (N+b) where N is the number of data blocks that are adjacent and match the compared data block and "b" is an integer greater than or equal to 1, and including an index bit in the index block indicating a match;
   e) storing and/or transmitting the coded bit stream; and
   f) decoding the coded bit stream to obtain the original bit stream.

2. The method of claim 1 wherein the step of dividing the original bit stream further includes the step forming the data blocks into blocks each having M bits and wherein the step of forming the coded bit stream further includes the step of forming the compressed blocks into blocks each having M bits.

3. The method of claim 1 wherein the step of forming a coded bit stream includes the step of positioning the data and compressed blocks in the same sequence corresponding to the original bit stream.

4. The method of claim 3 further including the step of positioning the index block in front of the associated data and compressed blocks.

5. The method of claim 3 further including the step of positioning the index block behind the associated data and compressed blocks.

6. The method of claim 1 further including the steps of counting the number of data blocks that are adjacent and match the compared data block and forming a compressed block containing data indicating the total number of data blocks in the group counted.

7. Method for efficiently transmitting and/or storing data representing an image, comprising the steps of:
   a) scanning an image to obtain an original bit stream representative of the image;
   b) dividing the original bit stream into a plurality of data blocks;
   c) comparing each data block for one of either a match or a mismatch with two differing reference blocks, each reference block having a predetermined bit pattern;
   d) forming a coded bit stream comprising an ordered sequence of a plurality of M-bit data blocks and compressed blocks and an M-bit index block, as follows:
      when a data block in the original bit stream is a mismatch with both of the reference blocks, adding a block that matches said mismatching data block to the coded bit stream and adding an index bit indicating a mismatch to the index block; and
      when a data block in the original bit stream is a match with one of the reference blocks, adding a compressed block indicating the matched reference block and the number (N+b) where N is the number of data blocks that are adjacent and match the compared data block and "b" is an integer greater than or equal to 1, and adding an index indicating a match to the index block;
   e) storing and/or transmitting the coded bit stream; and
   f) decoding the coded bit stream to obtain the original bit stream.

8. The method of claim 7 wherein the step of comparing each data block with the reference blocks includes the step of using one reference block having all logic "0"'s and an other reference block having all logic "1"'s.

9. Method for efficiently transmitting and/or storing data representing an image, comprising the steps of:
   a) scanning an image to obtain an original bit stream representative of the image;
   b) dividing the original bit stream into a plurality of data blocks;
   c) comparing each data block for one of either a match or a mismatch with a reference block having a predetermined bit pattern; and
   d) forming a coded bit stream comprising an ordered sequence of a plurality of M-bit data blocks and compressed blocks and an M-bit index block, as follows:
      when a data block in the original bit stream is a mismatch with the reference block, including the data block as is and including an index bit indicating a mismatch in the index block; and
      when a data block in the original bit stream is a match with the reference block, including a compressed block indicating the number (N+b) where N is the number of data blocks that are adjacent and match the compared data block and "b" is an integer greater than or equal to 1, and including an index bit in the index block indicating a match.

10. The method of claim 9, further comprising the steps of:
    e) storing the coded bit stream; and f) retrieving the stored coded bit stream and decoding the coded bit stream to obtain the original bit stream.

11. The method of claim 9, further comprising the steps of:
   e) transmitting the coded bit stream; and
   f) receiving the transmitted coded bit stream at a remote location and decoding the coded bit stream to obtain the original bit stream.

12. Method for efficiently transmitting and/or storing data representing an image, comprising the steps of:
   a) scanning an image to obtain an original bit stream representative of the image;
   b) dividing the original bit stream into a plurality of data blocks;
   c) comparing each data block for one of either a match or a mismatch with two differing reference blocks, each reference block having a predetermined bit pattern;
   d) forming a coded bit stream comprising an ordered sequence of a plurality of M-bit data blocks and compressed blocks and an M-bit index block, as follows:
      when a data block in the original bit stream is a mismatch with both of the reference blocks, adding a block that matches said mismatching data block to the coded bit stream and adding an index bit indicating a mismatch to the index block; and
      when a data block in the original bit stream is a match with one of the reference blocks, adding a compressed block indicating the matched reference block and the number (N+b) where N is the number of data blocks that are adjacent and match the compared data block and "b" is an integer greater than or equal to 1, and adding an index bit indicating a match to the index block.

13. The method of claim 12, further comprising the steps of:
   e) storing the coded bit stream; and
   f) retrieving the stored coded bit stream and decoding the coded bit stream to obtain the original bit stream.

14. The method of claim 12, further comprising the steps of:
   e) transmitting the coded bit stream; and
   f) receiving the transmitted coded bit stream at a remote location and decoding the coded bit stream to obtain the original bit stream.

15. Apparatus for efficiently transmitting and/or storing data representing an image, comprising:
   a) means for scanning an image to obtain an original bit stream representative of the image;
   b) means for dividing the original bit stream into a plurality of data blocks;
   c) means for comparing each data block for one of either a match or a mismatch with a reference block having a predetermined bit pattern;
   d) means for forming a coded bit stream comprising an ordered sequence of a plurality of data blocks and compressed blocks and an index block, as follows:
      when a data block in the original stream is a mismatch with the reference block, including the data block as is and including an index bit indicating a mismatch in the index block; and
      when a data block in the original bit stream is a match with the reference block, including a compressed block indicating the number (N+b) where N is the number of data blocks that are adjacent and match the compared data block and "b" is an integer greater than or equal to 1, and including an index bit in the index block indicating a match;
   e) means for storing and/or transmitting the coded bit stream; and
   f) means for decoding the coded bit stream to obtain the original bit stream.

* * * * *